United States Patent [19]

Henzel et al.

[11] 3,832,692

[45] Aug. 27, 1974

[54] PRIORITY NETWORK FOR DEVICES COUPLED BY A MULTI-LINE BUS

[75] Inventors: Russell A. Henzel, Ann Arbor, Mich.; Byron G. Gayman, Holliston, Mass.

[73] Assignee: Honeywell Information Systems Inc., Waltham, Mass.

[22] Filed: June 27, 1972

[21] Appl. No.: 266,768

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,353,160 | 11/1967 | Lindquist | 340/172.5 |
| 3,399,384 | 8/1968 | Crockett et al. | 340/172.5 |
| 3,425,037 | 1/1969 | Patterson et al. | 340/172.5 |
| 3,434,111 | 3/1969 | Schmidt et al. | 340/172.5 |
| 3,473,155 | 10/1969 | Couleur et al. | 340/172.5 |
| 3,534,339 | 10/1970 | Rosenblatt | 340/172.5 |
| 3,629,854 | 12/1971 | Hauck et al. | 340/172.5 |
| 3,643,229 | 2/1972 | Stuebe et al. | 340/172.5 |
| 3,676,860 | 7/1972 | Collier | 340/172.5 |
| 3,710,351 | 1/1973 | Nakamura | 340/172.5 |
| 3,742,148 | 6/1973 | Ledeen et al. | 340/172.5 |
| 3,752,932 | 8/1973 | Frisone | 340/172.5 |

*Primary Examiner*—Raulfe B. Zache
*Assistant Examiner*—John P. Vandenburg
*Attorney, Agent, or Firm*—John S. Solakian; Ronald T. Reiling

[57] ABSTRACT

A priority network including a multiple line bus coupled with a plurality of priority seeking devices, the device furthest down the bus having the lowest priority. In other words, the priority of each device is dependent upon its proximity to the input end of the bus. Each device determines whether it has priority or not by looking back at the priority indications of two or more previous devices coupled with the bus thereby decreasing the time required for a given device to gain access with a processor coupled with the bus. Means are also provided for clearing the priority indications of each of the plurality of devices, once a device has gained access with the bus and processor, thereby increasing the speed for clearing the priority network.

12 Claims, 3 Drawing Figures

PRIORITY NETWORK FOR DEVICES COUPLED BY A MULTI-LINE BUS

BACKGROUND OF THE INVENTION

The present invention relates generally to data processing systems and more particularly to priority determination techniques associated therewith.

Data processors are typically coupled with a plurality of devices each of which must have access to the data processor on a priority basis. The priority determination techniques of the prior art are numerous and in the usual cases generally accomplish such priority determination with complex electronics which has a fast response time or inexpensive electronics which has a rather slow response time.

One priority determination system of the prior art is described in an article by D. Chertkow and R. Cady entitled "Unified Bus Maximizer Minicomputer Flexibility," printed in the Dec. 21, 1970 edition of Electronics magazine at pages 47–52. Another priority determination system is described in U.S. Pat. No. 3,473,155, patented Oct. 14, 1969. Although each of these systems of the prior art appear to require simple and inexpensive electronics, the speed of response, i.e., the speed with which a priority determination is made, is directly dependent upon the number of devices seeking access to the data processor of the system. That is, since the priority determination is made in serial fashion, associated device circuit time delays of each device are relfected in increased response time of the system. As the requirement for increased data handling capabilities of the total data processing system increases, so too must the response time of the various components of the system decrease.

Accordingly, it is a primary object of the invention to provide a priority determination technique which is simple and inexpensive and which has an improved response time.

SUMMARY OF THE INVENTION

The above and other objects of the invention are attained by providing a priority network comprising a common bus having one end and a plurality of devices coupled to the bus, the priority of the devices determined by the device's proximity to such one end of the bus. In order to determine which of the devices is to gain access with the bus, in order for example to transfer information between the device and a data processor connected to such one end of the bus, means are provided in each of the devices to determine whether either of a plurality of preceding devices in closer priority on the bus to such one end has generated a priority indication signifying that a device is ready to gain access with the bus and further means are provided for enabling the one device, which does not receive such indication that either of the plurality of preceding devices is ready to gain access with the bus, to gain access with the bus. Means are further provided to clear the priority network, i.e., clear the priority indication of each device, after a device has gained access with the bus.

BRIEF DESCRIPTION OF THE DRAWINGS

The manner in which the present invention is constructed, and its mode of operation, will best be understood in the light of the following detailed description, together with the accompanying drawings, in which.

DETAILED DESCRIPTION OF THE PREFERRED EMBODIMENT

Figure 1:
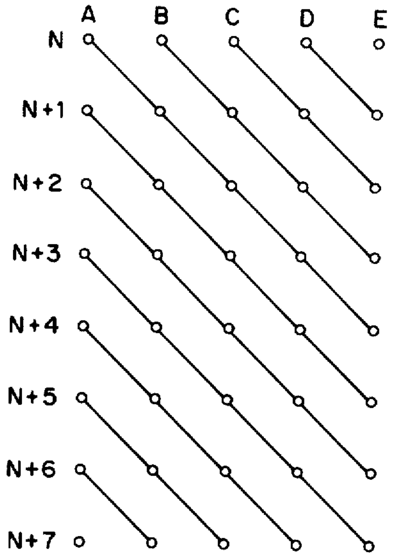
FIG. 1 illustrates the interconnection of a plurality of devices on the priority network.
Figure 3:
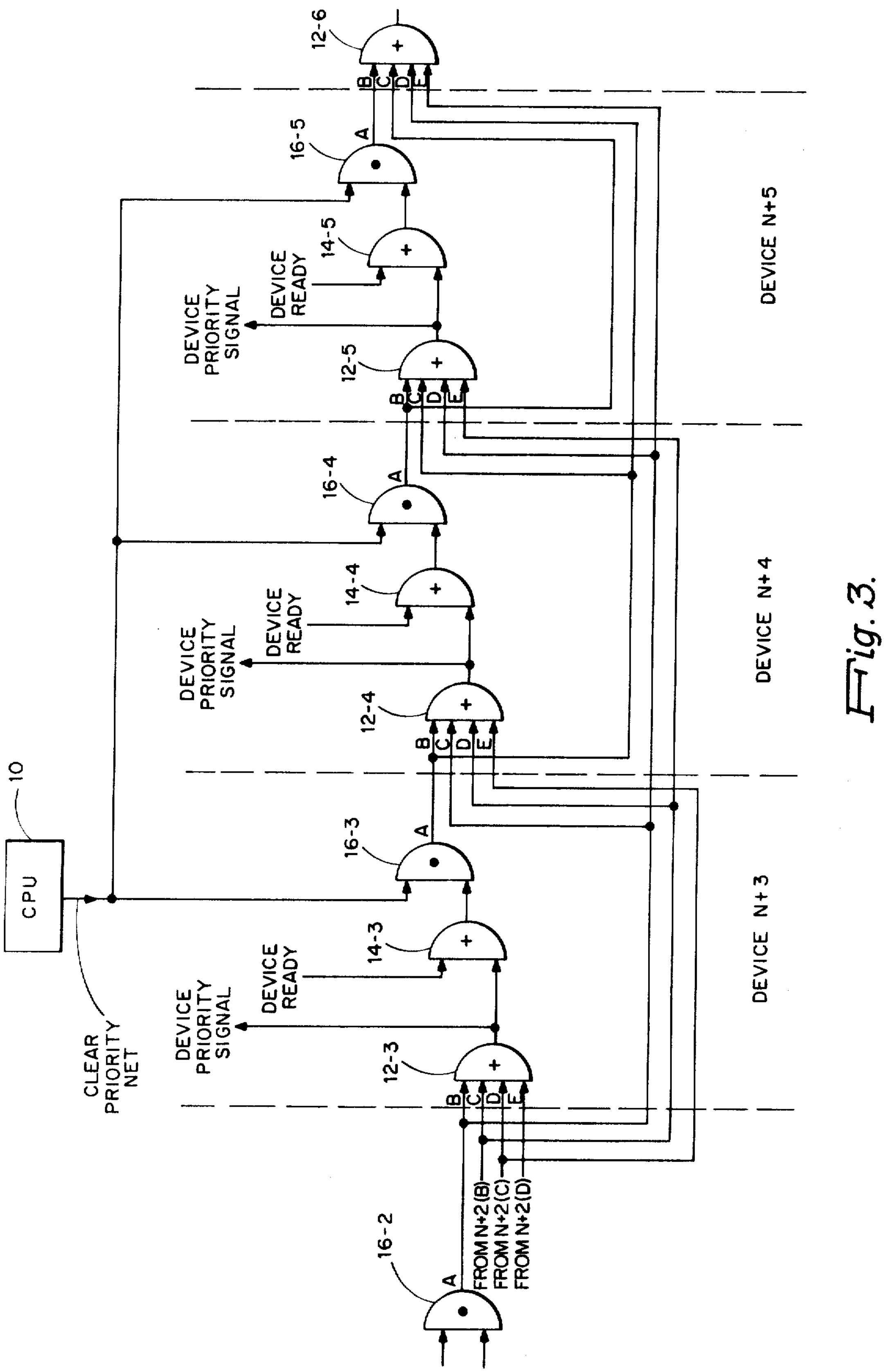
FIG. 3 illustrates representative logic of the priority network and interconnections thereof as shown in FIG. 1.

FIG. 1 illustrates the interconnections or bus of the priority network logic shown in FIG. 3. For purposes of illustration, eight devices N through N + 7 are shown interconnected at the position shown, it being understood that more than eight devices may have been included. The positions shown for the bus are for connectors of the interface electronics (including priority logic) of the various devices which may be located some distance away. The devices may include printers, memory devices such as tape and disc units, etc. Each device includes five connections, terminals A through E, associated with its priority logic connections. Terminal A provides the output or priority indication of each device's priority logic and terminals B through E are the input terminals thereof. There are four inputs (terminals B through E) shown by way of example. These four inputs allow the associated device to receive the priority indication of four previous devices. For example, device N+5 looks at the priority indication or output at terminal A of devices N+1 through N+4. This is termed the look-back feature of the invention. That is, each device knows whether it can gain access to a processor as shown in FIG. 3 by way of data paths of the bus (not shown), by looking back at the priority indication of the four previous devices. In further explanation, the system utilizing the present invention includes a priority bus for the priority network interconnections which each device is coupled to and also includes a data bus (not shown) for the data paths coupling each of the devices to a processor at one end of such data bus. When a device is said to have gained access with the bus, it is understood that the particular device may transfer information, including its identification, over the data bus and to the processor. Further, the device whose position is closest to the processor on the bus (the term bus hereinafter collectively referring to both the priority bus and the data bus) may be the highest priority device or lowest priority device depending upon the direction of interconnections of each device's priority logic relative to the location of the processor with respect to one end of the bus. It should be understood that the look-back feature of the invention may extend to simply two devices as illustrated in the application entitled "Data Processing System Having Automatic Interrupt Identification Technique", filed June 27, 1972, and whose Serial Number is 266,759; or the look-back feature may extend to more than four devices, for example eight devices.

The look-back feature thus minimizes the time required for the priority indication of each device to propagate down the bus. For example, if there were no look-back feature incorporated in the priority network, then the first device would receive a priority indication that could be simply a ground signal, that is the first device's input (each device in this example having but one input) would be directly connected to circuit ground. The false state indicated by the ground signal would indicate to the first device that it has the highest priority. If the first device does not require access with the bus, then it would pass on or regenerate the false state to the second device. Also, if the second device does not require access with the bus, then it would pass on the false state to the third device and so on. Each time the false state passes through a device, a logic circuit time delay is introduced. Thus if there are 30 devices coupled with the bus and if the logic crcuit time delay for each device is in the order of 10 nanoseconds, then it would take approximately 300 nanoseconds for the last device to find out whether it can gain access with the bus. If there was a two device look-back feature incorporated, then this time would be halved to approximately 150 nanoseconds and further if a four device look-back feature were incorporated then the time would be approximately 75 nanoseconds for the priority indication to propagate to the last device coupled with the bus.

For example, in a system having a four device look-back feature, and referring to FIG. 1, device N would have each of its input terminals B through E coupled to a voltage level which may be circuit ground, which for purposes of discussion is the false state. Thus device N seeing the false state at each of its inputs, knows (as shall be more particularly seen) that it may gain access with the bus. The priority indication at output terminal A of device N is received at input terminals B, C, D and E of devices N+1, N+2, N+3 and N+4 respectively at effectively the same time. Also, device N+1 receives the false state at its input terminals C, D and E at effectively the same time that device N receives the false state at its input terminals B through E. The false state is also received at input terminals D and E of device N+2 and input terminal E of device N+3 also at the same time the false state is received at input terminals B through E of device N.

Each device simultaneously indicates its priority indication based on the signal state at its input terminals. Accordingly, device N+4 receives the priority indication at terminal A of each of devices N through N+3 at the same time. Each such priority indication takes one logical circuit delay time; however, since the priority indications are made in parallel, a total of only one logical circuit delay time is introduced for every four devices coupled with the bus. If for example, neither of devices N through N+3 requires access with the bus, then each of their priority indications is indicated as the false state, each of which states are received at the same time at input terminals B through E of device N+4. Device N+4 accordingly knows after but one logical circuit delay time that it may gain access with the bus if it is ready to do so. If either of the priority indications of devices N through N+3 was a true state, indicating that one of such devices was ready to gain access with the bus, then device N+4 would know after but one logical circuit delay time that it could not gain access with the bus.

Now referring with more particularity to FIG. 3, representative priority indication logic is shown for devices N+3 through N+5. The output gate of device N+2 and the input gate of device N+6 are also shown. Each of the devices includes an input OR gate 12 having input terminals B, C, D and E. Each of the OR gates 12 has its output coupled to one input of OR gate 14 and to associated circuitry of the device by means of the Device Priority Signal. The output of OR gate 14 may be directly coupled to one input (terminal B) of the next device's OR gate 12 or may be preferably coupled to an AND gate 16 which is introduced in order to incorporate a further feature of the invention, namely, the clear priority net feature which shall be subsequently discussed. The OR gate 14 is coupled to receive at its other input a Device Ready signal also from the associated circuitry of the particular device.

Representative of the associated circuitry hereinabove referred to with respect to the Device Priority Signal and the Device Ready signal, is that circuitry shown in the above-cited application whose Serial Number is 266,759. Briefly, the Device Priority Signal indicates to the particular device, based upon the inputs received by OR gate 12, either a false state thereby indicating that the particular device may gain access with the bus, or a true state thereby indicating that the particular device may not gain access with the bus, the latter situation meaning that a previous higher priority device desires to gain such access. The Device Ready signal indicates that the particular device is ready to gain access with the bus and is therefore in a true state, or that it is not ready to gain such access and is therefore in a false state.

The interconnection of the gates 12 and gates 14 (assuming that without AND gates 16, the output terminal of gates 14 is the A terminal) are as shown in FIG. 1 and need not be further discussed. However, by way of example, assume that device N+4 is ready to gain access with the bus. Accordingly, its Device Ready signal is in the true state. Also assume that devices N through N+3 are not ready to gain access with the bus. Accordingly, each of the signals received at terminals B, C, D and E of OR gate 12-4 is in the false state and therefore the Device Priority Signal is in the false state indicating to device N+4 that it may gain access with the bus. The Device Ready signal being in the true state (and assuming that the output of OR gate 14-4 is directly coupled to the B input terminal of OR gate 12-5) indicates to device N+5 that a previous device has gained access with the bus and that it, device N+5, may not gain access with the bus. The true state generated by the Device Ready signal of device N+4 thus propagates to each of the subsequent devices N+5 through N+7.

Thus it has been seen that the response time of the priority network of the invention, in determining which device is to gain access with the bus, has been reduced by a factor dependent upon the extent of the look-back to the priority indications of previous or preceding devices. Further each device has not only received priority indications from the four preceding devices (by our example) but also, based on the four inputs received at the particular device's OR gate 12, simultaneously knows the priority indication of all preceding devices. This is true because the priority indications of all preceding devices are reflected in the priority indication of such four immediately preceding devices.

Once the identification (over lines of the bus not shown) of the device which has gained access to the bus is latched into the processor (CPU) 10 such that for example processing may begin for such device based upon its identification, the priority network of the invention may free or clear itself in order to respond to the access requirements of other devices. Without AND gates 16 and the Clear Priority Net signal which may be provided by processor 10 in response to the latching of the identification of the previous accessing device, the priority network takes an appreciable time in so freeing or clearing itself. That is, if the first device in a system, irregardless of the presence or absence of a look-back feature, had access with the bus and thus generated a true state from its terminal A, which propagated to the last device, then in a 30 device system, it would take 30 times the 10 nanosecond delay time per device (i.e., approximately 300 nanoseconds) for the transition from the true state to the false state of the priority indications of each device, thereby clearing the priority indication of each device. This is true irregardless of the presence or absence of the look-back feature of the invention since the change from the true state to the false state of each device's priority indication is dependent upon such change in state of its immediately preceding device.

Accordingly, in order to reduce the time required to clear the priority network, AND gates 16 are introduced into the priority logic of each device. Coupled to one input of AND gates 16 is the Clear Priority Net signal. The Clear Priority Net signal is generated after the device which most recently gained access with the bus, had its address latched, i.e., stored for addressing the memory associated with processor 10. The generation of the Clear Priority Net signal causes the output terminal A of AND gate 16 to go to the false state. Since each device has its AND gates 16 coupled to receive the Clear Priority Net signal, then the output of the device, i.e., the priority indication goes to the false state in a minimal period of time. In further explanation, the Clear Priority Net signal is normally in the true state which enables the signal state at the output of OR gates 14 to be transferred to terminals B, C, D and E of the subsequent four device OR gates 12. When the priority network is to be cleared, the Clear Priority Net signal goes to the false state only for that period of time required to insure that the output of OR gates 12 are also in the false state. Thus the minimal period of time to clear the network depends upon how fast the outputs of OR gates 12 can be forced into the false state. Thus, in summary, the total time for the next device to gain access with the bus is determined by the time to clear the priority network plus the time required for the next device to have its identification latched into processor 10.

In certain situations, some of the positions in the bus of the priority network are not used either because a device has been eliminated from the system, or that a device is contemplated for that particular priority position at a future time, or possibly because the interface electronics which actually is in physical proximity to the bus at a particular location or position includes sufficient electronics such that two layered boards of electronics plug into one position, thereby preventing use of an adjacent position, or that the position is used by a device which is not connected to the priority network. In order to maintain the priority network as originally contemplated and without having to add additional electronics, it has been found that an electrical connection or short jumper is all that is required, the jumper being connected between terminals A and B of the position which is empty or contains logic which does not use the priority network.

Figure 2:
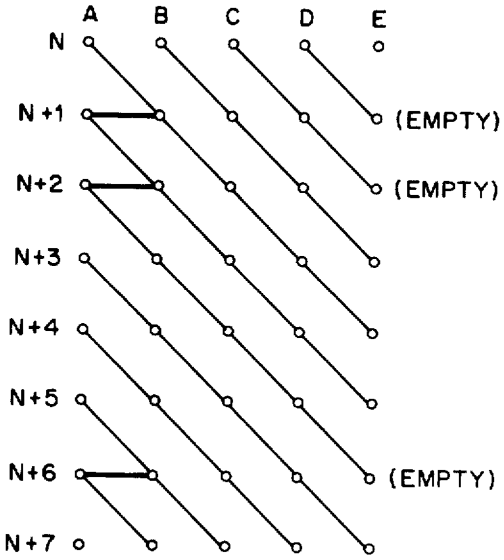
FIG. 2 illustrates a further embodiment of the interconnection of a plurality of devices on the priority network.

Thus, referring to FIG. 2, the position for devices N+1, N+2 and N+6 are shown to be empty. This illustrates that continguous positions as well as isolated positions on the bus may be empty, that is absent of a device's interface electronics which includes the priority logic. Accordingly, the gate 16 coupled to output terminal A drives the gates associated with terminals B, C and D of device N+3; C, D and E of device N+4; D and E of device N+5; and E of device N+6 if position N+6 were not empty. Accordingly, device N would have the highest priority and device N+3 would have the next highest priority, etc. Further, the fact that there are empty positions does not slow down the response of the system. For example, the output at terminal A of device N is received by the input terminal E of device N+6 at the same time that the outputs at terminal A of devices N+3, N+4, and N+5 are received at terminals B, C, and D of device N+6. Accordingly, if device N+6 were in the system, then it would know whether it could gain access with the bus just as fast as device N+4 would have known if the positions associated with devices N+1 and N+2 were not empty.

No further drive current or loading is introduced either, irregardless of the number of empty positions on the bus. For example, with no positions empty, then gate 16 of device N would require enough load drive capability for four loads, that is the four loads introduced by the four gates 12 associated with the devices N+1 through N+4. With the two empty positions for devices N+1 and N+2 and assuming that position N+6 is not empty, there are also four equal loads introduced. The loads are those associated with the OR gates 12 of devices N+3 through N+6. That is, even though the number of input signals provided by the signal at terminal A of device N increased from four to nine, the number of loads has remained at four. This is because the gates 12 utilized are of the transistor-transistor-logic type or equivalent which requires only a basic current to activate it. Thus in this example where OR gates 12 of devices N+3, N+4 and N+5 receive more than one input from terminal A of device N, it, OR gate 12 of such device only requires a fixed or basic current for activation. Accordingly, the current drain on gate 16 of device N is not increased. Also, by adding the jumper between terminals A and B of an empty position, the line coupled from the A terminal is not left floating which would introduce noise problems due to the noise sensitivity of the floating line. Rather such line is driven thereby avoiding noise problems.

Having described a priority network which is simple and inexpensive in construction, which is highly configurable for present and future requirements, and which provides optimized response in both accessing a device with the bus associated with the network and in clearing the network, what is claimed as new and novel and for which it is desired to secure Letters Patent is:

1. The combination comprising:

A. a common bus having one end;

B. a plurality of devices coupled with said bus, the priority of said devices being determined by their proximity to said one end; and C. means for determining which of said devices is to gain access with said bus, said means for determining comprising:
1. means in each of said devices for concurrently detecting whether either of a plurality of preceding devices in closer proximity on said bus to said one end is ready to gain access with said bus, and
2. means for enabling the one of said devices, which does not receive an indication that either of said plurality of preceding devices is ready to gain access with said bus, to gain access with said bus.

2. The combination of claim 1 wherein said means for detecting further comprises:
A. a priority indication output line associated with each of said devices; and
B. means, associated with each of said devices, for generating a signal on said output line, said signal having a first state when the associated device is ready to gain access with said bus and said signal having a second state when said associated device is not ready to gain access with said bus.

3. The combination of claim 2 wherein said means for detecting further comprises logic means, associated with each of said devices and coupled to receive the signal on said output line of a plurality of preceding devices, for producing a further signal having a first state if any one of said preceding devices has said first state of said signal on its output line, said further signal having a second state if all of said preceding devices have said second state of said signal on their output lines.

4. The combination of claim 3 wherein said means for detecting further comprises:
A. means for coupling said further signal for receipt by said means for generating; and wherein
B. said signal on said output line has a first state when any of said preceding devices is ready to gain access with said bus and has a second state when none of said preceding devices is ready to gain access with said bus, said second state of said signal indicating that the associated device may gain access with said bus.

5. The combination of claim 4 further comprising means for simultaneously changing the state of said signals on each of said output lines to said second state after a device has gained access with said bus.

6. The combination comprising:
A. a common bus having one end;
B. a plurality of devices coupled with said bus for transfer of information on said bus with one of said devices when enabled, the priority of said devices being determined by their proximity to said one end;
C. priority lines coupled with some of said devices; and
D. means in each of said devices for simultaneously detecting whether any higher priority device coupled with said priority lines is ready to transfer information with said bus.

7. The combination of claim 6 further comprising means for enabling the one of said devices, which does not detect that any higher priority device is ready to transfer information with said bus, to transfer information with said bus.

8. The combination of claim 6 wherein said means for detecting comprises:
A. means in each of said devices for generating a first signal if said device is ready to transfer information with said bus;
B. means in each of said devices for producing a second signal in response to the detecting of the generation of said first signal by a plurality of said devices; and
C. means responsive to said second signal and/or said first signal for producing a third signal indicating to lower priority devices that a higher priority device is ready to transfer or is transferring information with said bus.

9. The combination of claim 8 further comprising means for simultaneously changing said third signal to a fourth signal after said information has been transferred with said bus by the last highest priority device, said fourth signal indicating that any other device may be enabled to transfer information with said bus.

10. A priority network for enabling the highest priority requesting device of a plurality of devices to gain access with a bus in order to transfer information on said bus, said network comprising a plurality of network lines coupling a plurality of priority indication logic, one of said priority indication logic associated with each of said devices, said logic comprising:
A. an output line;
B. a plurality of input lines;
C. means for indicating by means of a first signal that a device is ready to transfer information;
D. means for coupling the output lines of some of said devices, each to different ones of said plurality of input lines of the same device;
E. means coupled to said plurality of input lines for producing a second signal if any one of said some of said devices is ready to transfer information; and
F. means responsive to either said first signal or said second signal for providing a third signal on said output line, said third signal indicating that a higher priority device has gained access for transfer of information with said bus.

11. A network as in claim 10 wherein said logic further comprises means for changing said third signal to a fourth signal, said fourth signal indicating that another device may gain access for transfer of information with said bus.

12. A network as in claim 10 wherein said logic is coupled to positions of said network lines in increasing priority relationship from one end of said network lines and wherein said logic further comprises means for bypassing one of said positions in said priority relationship, said means for bypassing including means for coupling the output line of the device immediately preceding the bypassed position to an additional input line of the device immediately succeeding said bypassed position.

* * * * *